United States Patent
Linde

(10) Patent No.: US 8,417,905 B2
(45) Date of Patent: *Apr. 9, 2013

(54) METHODS AND APPARATUS FOR POINT-IN-TIME VOLUMES

(75) Inventor: David A. Linde, Fort Lauderdale, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,417

(22) Filed: Aug. 25, 2011

(65) Prior Publication Data

US 2012/0078856 A1 Mar. 29, 2012

Related U.S. Application Data

(60) Continuation of application No. 10/893,477, filed on Jul. 15, 2004, now Pat. No. 8,010,756, which is a division of application No. 10/044,327, filed on Jan. 10, 2002, now Pat. No. 6,799, 258.

(60) Provisional application No. 60/261,036, filed on Jan. 10, 2001, provisional application No. 60/261,583, filed on Jan. 14, 2001.

(51) Int. Cl.
*G06F 12/00* (2006.01)

(52) U.S. Cl.
USPC ............................ 711/161; 711/162; 707/649

(58) Field of Classification Search .................. 711/161, 711/162; 707/649
See application file for complete search history.

(56) References Cited

U.S. PATENT DOCUMENTS

| | | | |
|---|---|---|---|
| 5,446,871 A | 8/1995 | Shomler et al. | |
| 5,857,208 A | 1/1999 | Ofek | |
| 5,913,215 A * | 6/1999 | Rubinstein et al. | 707/708 |
| 5,937,343 A | 8/1999 | Leung | |
| 6,061,770 A | 5/2000 | Franklin | |
| 6,065,018 A | 5/2000 | Beier et al. | |
| 6,289,357 B1 | 9/2001 | Parker | |
| 6,366,986 B1 * | 4/2002 | St. Pierre et al. | 711/162 |
| 6,397,308 B1 * | 5/2002 | Ofek et al. | 711/162 |
| 6,629,110 B2 | 9/2003 | Cane et al. | |
| 6,647,474 B2 | 11/2003 | Yanai et al. | |
| 6,651,075 B1 | 11/2003 | Kusters et al. | |

OTHER PUBLICATIONS

Letter from J. Bocksor, VP Product Development, DataCore Software Corporation, to Joseph Neill at Unisys Corporation, dated Sep. 17, 1999.

D. Golds, "Storage Snapshot: Volume Snapshot Service" [online], [WinHEC, Mar. 26-28, 2001]. Retrieved from the Internet <URL: http://www.microsoft.com/WinHec/sessions2001/EntStor.htm.

(Continued)

*Primary Examiner* — Matthew Bradley
(74) *Attorney, Agent, or Firm* — Rader, Fishman & Grauer PLLC

(57) ABSTRACT

Methods and apparatus for point-in-time volumes are provided. A relationship is enabled between a source volume and point-in-time volume. Copying a data chunk to the point-in-time volume before a write operation modifies the data chunk on the source volume dynamically creates the point-in-time volume. The point-in-time volume can be accessed in read/write mode as a general purpose data storage volume. Other embodiments comprising additional features, such as a forced migration process, are also provided.

14 Claims, 12 Drawing Sheets

OTHER PUBLICATIONS

"Data Protection—Disk-Based Solutions", Network Appliance [online], [retrieved on Oct. 20, 2001]. Retrieved from the Internet <URL:///www.netapp.com/solutions/data_protection_disk.html.

"PowerVault 530F Features", Dell Computer Corporation [online], [retrieved on Oct. 20, 2001]. Retrieved from the Internet <URL:http://www.dell.com/us/en/esg/topics/products_san_pvaul_001_san_appli.htm.

"IBM RAMAC SnapShot for VM/ESA Version 1 Release 1" [online], [retrieved on Oct. 20, 2001]. Retrieved from the Internet <URL: http://www.storage.ibm.com/hardsoft/diskdrls/snapshot/vmspec.htm.

"Deliver Non-Stop Availability", DataCore Software Corporation [online], retrieved from the Internet <URL: http://128.121.236.245/produicts/pro_features_avail.asp.

B. Goldworm, "Vendor Profile: FalconStor Aims to Provide a Complete Set of Storage Services", Storage Networking World Online [online], [retrieved on Jul. 22, 2002]. Retrieved from the Internet <URL:http://www.snwonline.com/whats_new/falcor_07-22-02.asp?s=2201.

* cited by examiner

535

Data Maps

Migration Table                Delta Table
        610                           620

| Chunk | Migrated |
|-------|----------|
| 0     | True     |
| 1     | True     |
| 2     | True     |
| 3     | False    |
| 4     | False    |
| 5     | False    |
| ...   | ...      |
| N     | False    |

| Chunk | Delta |
|-------|-------|
| 0     | True  |
| 1     | False |
| 2     | False |
| 3     | False |
| 4     | False |
| 5     | False |
| ...   | ...   |
| N     | False |

FIG. 6

METHODS AND APPARATUS FOR POINT-IN-TIME VOLUMES

CROSS-REFERENCE TO RELATED APPLICATIONS

This is a continuation application of application Ser. No. 10/893,477, filed Jul. 15, 2004, now U.S. Pat. No. 8,010,756, which is a divisional of application Ser. No. 10/044,327, filed Jan. 10, 2002, now U.S. Pat. No. 6,799,258, which claims priority to Provisional Patent App. Ser. Nos. 60/261,036, filed Jan. 10, 2001 and Ser. No. 60/261,583, filed Jan. 14, 2001. The application Ser. Nos. 10/044,327, 60/261,036 and 60/261,583 are incorporated herein by reference in their entireties.

TECHNICAL FIELD

This invention relates generally to data storage and, more particularly, to point-in-time volumes.

BACKGROUND

Like other important assets, data needs to be protected against loss or damage. Conventionally, data backups are used for safeguarding important data. A data backup process generally involves duplicating large amounts of data on a backup device such as a tape. The time required to copy a data set is a function of the size of the data set. With current data sets in the range of several terabytes and future data sets even larger, much time is required to perform a data backup process.

During typical data backup procedures, the source volume cannot be written to until the backup procedure is complete. This is necessary to maintain file system or volume integrity during the backup process. A transaction processing application, for example, must not be allowed to change data on the source volume during the backup process because the resulting data backup may be corrupted by partial or incomplete, transactions. Typically, this limitation requires the source volume to be unavailable to production applications during the backup procedure.

Further, the amount of time required to perform a data backup coupled with the unavailability of the production data set makes it impractical to perfoliu full data backups on modern data processing systems. These systems work on data continuously and cannot afford to be unavailable during a data backup. Even in environments that can tolerate data unavailability during non-business hours, the backup process may not have sufficient time to complete during the non-business hours.

In the event of loss or damage to production data, the data must be restored. Similar to conventional data backups, restoring a system to a prior state is also a time-consuming process during which data is unavailable to production systems. The downtime associated with restoring data after, e.g., a virus infection, often translates into lost revenue and higher administration costs.

Point-in-time technology addresses limitations of conventional data storage, processing, and protection techniques. In the event of file system corruption, for example, point-in-time methods could be used to restore the file system without a time-consuming conventional restoration from a backup set.

Point-in-time technology also solves the problem of data availability during a backup process. The state of a storage system can be saved at a particular point in time with minimal disruption. Unlike conventional data backup processes, a typical point-in-time process can complete without making the source volume unavailable to production applications. Thus, point-in-time processes enable data protection in environments where conventional data backups are not feasible due to availability concerns.

Existing point-in-time technologies, however, have a number of limitations. In some point-in-time implementations, there is continued dependence on a source volume because the source volume is not fully replicated. This dependence generates extra input/output requests to the source volume that consume bandwidth and storage system resources.

Other backup and point-in-time implementations have been application specific. These approaches have the disadvantage that the point-in-time image cannot be used as a general-purpose volume available for both reading and writing while the source volume, upon which the point-in-time volume is based, is in use.

Conventional backup and point-in-time implementations also lack desirable data sharing features. Data sharing is the ability of multiple applications or multiple machines to access and to process the same or a similar data set. Data sharing is often not feasible using conventional point-in-time methods because these methods lack general-purpose volume availability.

What is therefore needed is a method and apparatus for point-in-time volumes that is minimally disruptive of the availability of the source volume, does not consume bandwidth and storage system resources because of dependence on the source volume, can be used as a general purpose volume available for both reading and writing, and provides for efficient data sharing.

SUMMARY OF THE INVENTION

An embodiment of the present invention provides a method and apparatus for point-in-time volumes. A point-in-time volume represents the contents of a source volume in a particular past state. A point-in-time volume can be dynamically created without disrupting the availability of the source volume. Data chunks are copied to the point-in-time volume before a data write operation modifies the data chunk on the source volume. The point-in-time volume, therefore, includes data chunks from the source volume in a past state.

In an embodiment, the point-in-time volume is used to restore the source volume to its prior state. In another embodiment, the point-in-time volume is used as a general purpose data storage volume. Data processing and sharing applications, therefore, can read and write to a point-in-time volume.

In further embodiments, a forced migration process can replicate a source volume to a point-in-time volume. In the event of a failure of the source volume, a point-in-time volume can be used for disaster recovery. In an embodiment of the present invention, point-in-time volumes are accessible in read/write mode, so an independent point-in-time volume could be mapped in place of a failed or damaged source volume.

Further features of the invention, its nature and various advantages will be more apparent from the accompanying drawings and the following detailed description.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 6 illustrates further details of data maps;

DETAILED DESCRIPTION OF THE EMBODIMENTS

The present invention now will be described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

Figure 1:
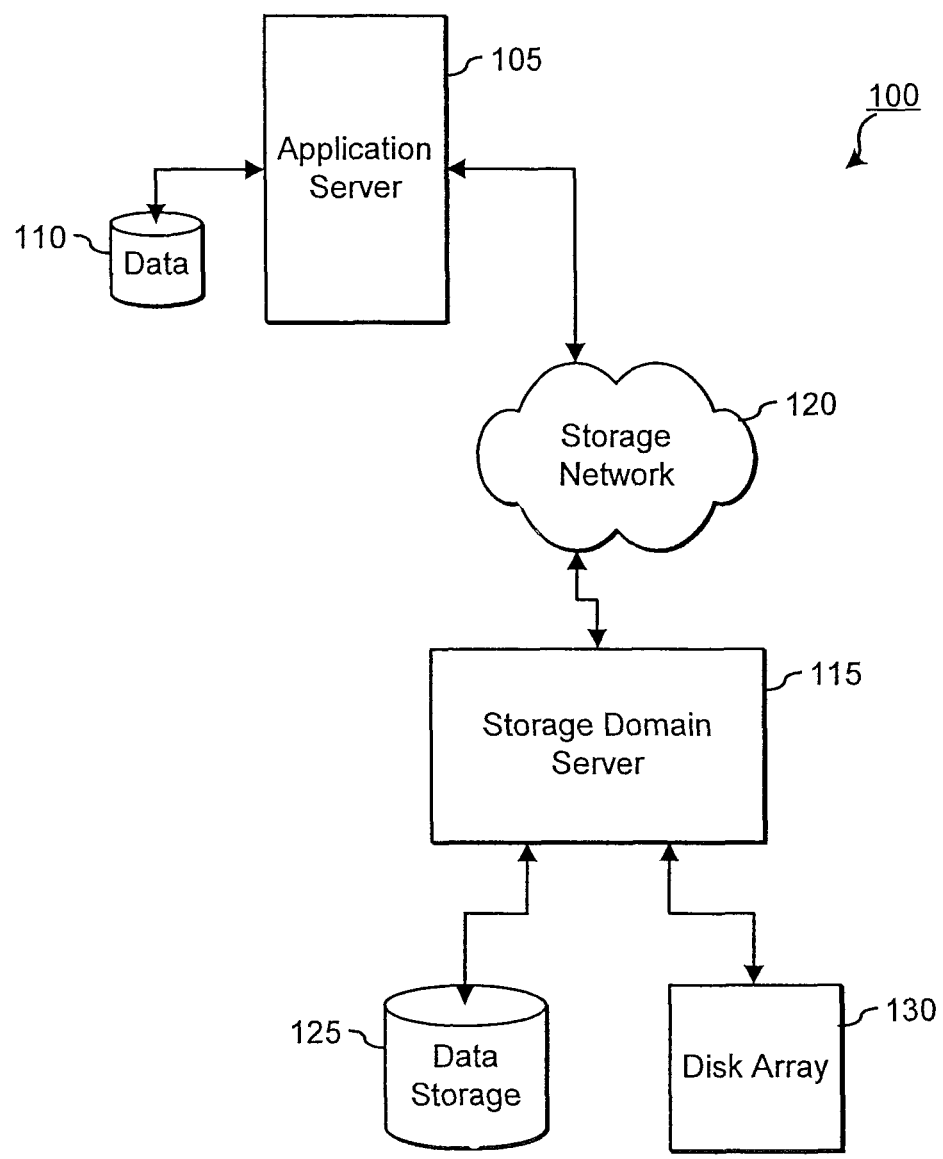
FIG. 1 is an exemplary block diagram of a data processing and storage system.

FIG. 1 is an exemplary block diagram of a data processing and storage system 100. In the illustrated embodiment, application server 105 and storage domain server 115 communicate across storage network 120. Storage network 120 is preferably a storage area network (SAN) implementing the fibre channel protocol, but can be any suitable network architecture implementing a suitable protocol (e.g., various fibre channel topologies and local or wide area networking protocols). Data storage 125 and disk array 130 are data storage devices connected to storage domain server 115. Data storage 125 and disk array 130 are, e.g., SAN-attached or network attached storage devices that form a network storage pool. Application server 105 preferably includes local data 110 for use as temporary or other storage. Application server 105 is, e.g., an Intel processor based server architecture running the Microsoft Windows NT operating system. Storage domain server 115 is an intelligent storage virtualization node implementing layered SAN infrastructure. One such storage domain server is SANSymphony software running on Intel x86-based server architecture available from DataCore Software Corp., Fort Lauderdale, Fla. Storage domain server 115 preferably includes a graphical user interface, command line interface, and application programming interface. In an embodiment, storage domain server 115 implements features of the present invention via a data storage device driver. The driver can be constructed of software layers, hardware layers, or a combination of software and hardware. Software is preferably distributed on a computer readable medium, which includes program instructions. One skilled in the art will appreciate that the program instructions can be in any appropriate form, such as source code, object code, or scripting code. Storage domain server 115 is described in further detail below and with reference to FIG. 12.

Storage domain server 115 virtualizes the interface between application server 105 and data storage 125 and disk array 130. In a preferred embodiment, storage domain server 115 presents storage resources to application server 105. The storage resources presented represent virtual volume images that application server 105 can mount or otherwise access. From the perspective of application server 105, the virtual volume image appears to the operating system like a storage device to which application server 105 can read and write data blocks. Storage domain server 115 processes the input and output requests on these virtual volumes to generate read and write requests to the physical storage resources, e.g., data storage 125.

Figure 2:
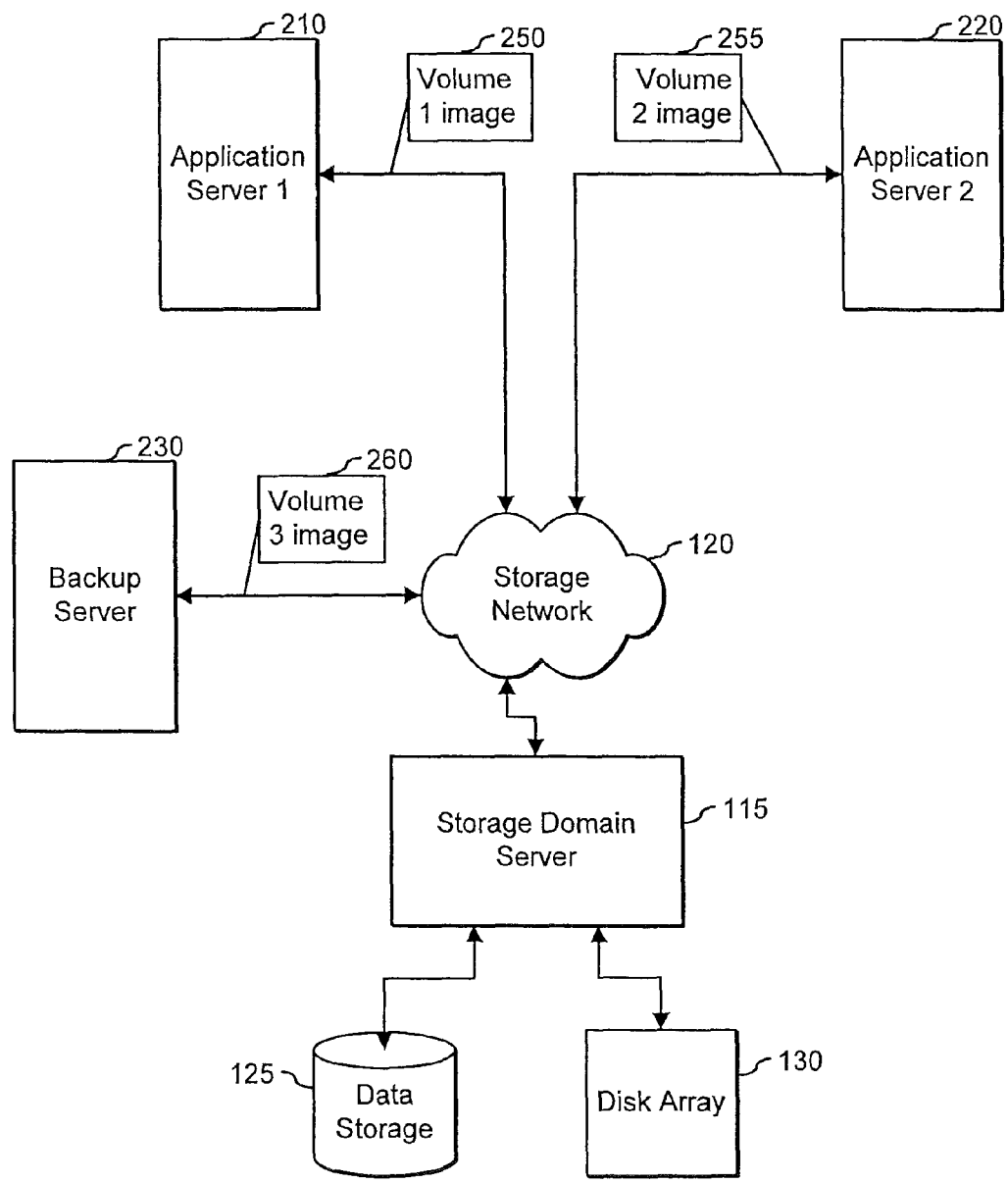
FIG. 2 is an exemplary block diagram illustrating storage volume presentation on a processing and storage system.

FIG. 2 is an exemplary block diagram illustrating storage volume presentation on a processing and storage system. In this illustration, application server 1 (210), application server 2 (220), and backup server 230 are connected to storage network 120. Storage domain server 115 presents volume 1 image 250, volume 2 image 255, and volume 3 image 260 through storage network 120. These volume images are virtual representations of resources allocated on data storage 125 or disk array 130. Volume 1 image 250 is presented to application server 1 (210) whereby application server 1 can mount the file system or file systems contained in volume 1. Volume 1 is said to be mapped to application server 1. Similarly, application server 2 (220) is shown mapped to volume 2 image 255 and backup server 230 is mapped to volume 3 image 260. This configuration generally reflects the virtualization of storage devices, whereby application servers or other data producers or consumers do not directly access backend storage. Rather, storage domain server 115 provides data storage services to clients (e.g., application server 1 (210)) through volume presentation and mapping.

As an example of virtualization in this exemplary embodiment, data storage 125 provides physical resources for both volume 1 image 250 and volume 2 image 255. Volume 3 image 260, however, physically resides on disk array 130. Data storage 125 has a capacity of, e.g., 1 terabyte. Storage domain server 115 equally allocates 500 gigabytes to both volume 1 image 250 and volume 2 image 255. Thus, from the perspective of application server 1 (210), volume 1 image 250 looks like a storage device with a capacity of 500 gigabytes.

Storage domain server 115 can selectively present virtual storage volumes to servers. Thus, storage domain server 115 can unmap volume 2 image 255 from application server 2 (220) and present volume 2 image 255 to backup server 230. Backup server 230 could map both volume 3 image (as shown) as well as volume 2 image (not shown).

Figure 3:
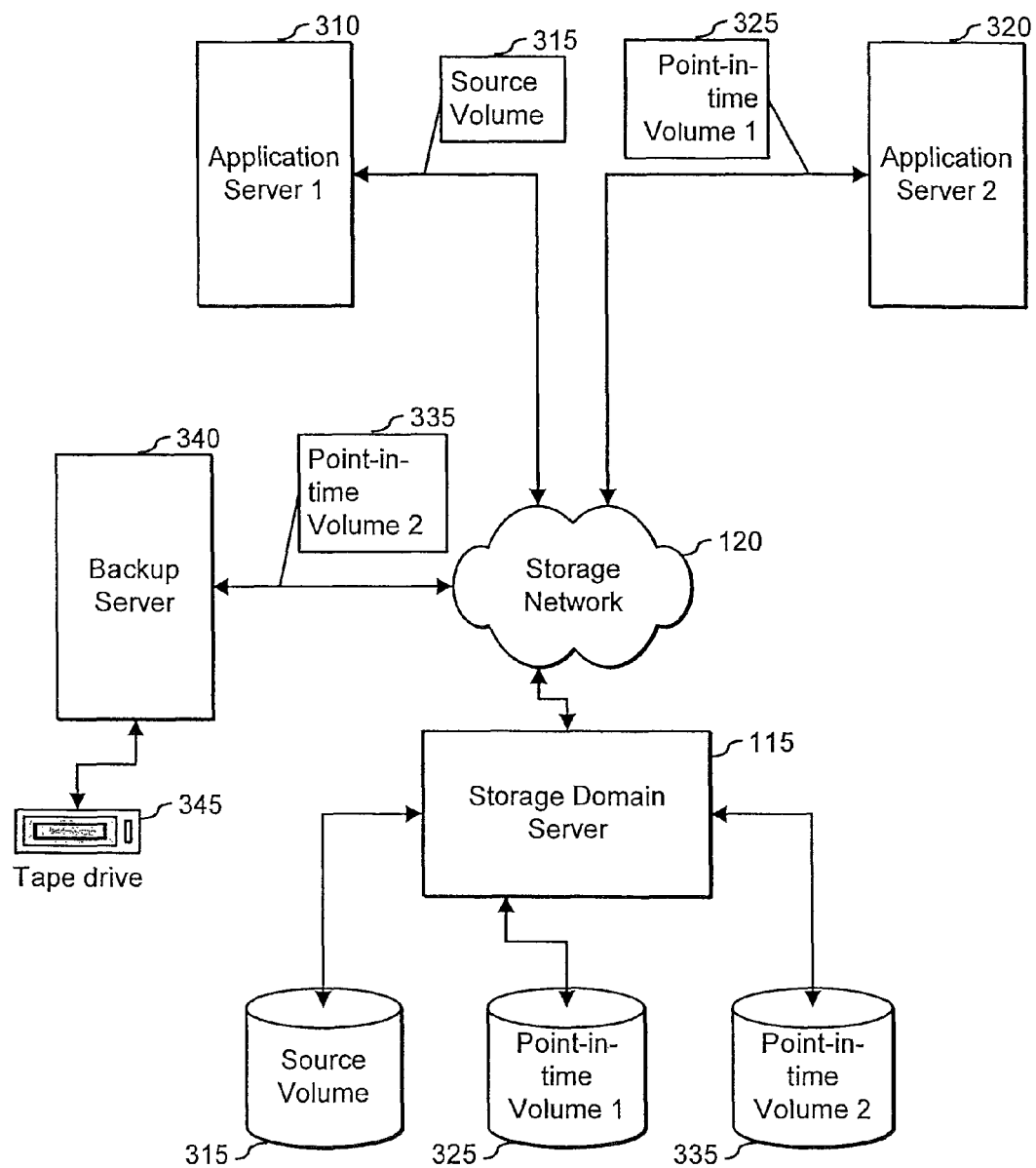
FIG. 3 is a block diagram illustrating storage volume presentation and point-in-time volumes according to an embodiment of the present invention.

FIG. 3 is a block diagram illustrating storage volume presentation and point-in-time volumes according to an embodiment of the present invention. A point-in-time volume represents the contents of a source volume in a particular past state. In this example embodiment, given a current time of $t_0$, point-in-time volume 1 (325) is a representation of the contents of source volume 315 at time $t_{-1}$. Point-in-time volume 2 (335) is a representation of the contents of source volume 315 at time $t_{-2}$. That is, both point-in-time volumes 1 and 2 (325 and 335 respectively) represent the past state of source volume 315 at particular points-in-time. Storage domain server 115 can selectively present point-in-time volumes to application servers. Point-in-time volumes are described in further detail below.

Application server 1 (310) maps source volume 315 and application server 2 (320) maps point-in-time volume 1 (325). Backup server 340 maps point-in-time volume 2 (335). Source volume 315, point-in-time volume 1 (325), and point-in-time volume 2 (335) are accessed through storage network 120. Storage domain server 115 virtualizes accesses to the backend data storage.

In operation, the relationship between source volume 315 and point-in-time volume 1 (325) (snapshot relationship) is enabled at time $t_{-1}$. After the point-in-time volume relationship is enabled, application server 1 (310) continues to manipulate data on source volume 315. Although data blocks have been read and modified on source volume 315 at time $t_0$, point-in-time volume 1 (325) continues to reflect the contents of source volume 315 at time $t_{-1}$ when the relationship was enabled. Thus, point-in-time volume 1 (325) is said to be a snapshot of source volume 315 at time $t_{-1}$.

Similarly, the relationship between source volume 315 and point-in-time volume 2 (335) is enabled at time $t_{-2}$. Point-in-time volume 2 (335) is said to be a snapshot of source volume 315 at time $t_{-2}$. As discussed above in this embodiment, storage domain server 115 presents point-in-time volume 2 (335) to backup server 340. Backup server 340 maps point-in-time volume 2 (335) and performs a file-level backup operation on the volume to tape drive 345. Importantly, application server 1 (310) can concurrently read and write data blocks on source volume 315 while backup server 340 performs a file-level backup.

Further, application server 2 (320) can read and write data blocks to point-in-time volume 1 (325) while application server 1 (310) is modifying data blocks on source volume 315 upon which point-in-time volume 1 (325) is based. For example, application server 2 could be performing virus scanning and cleaning on point-in-time volume 1 (325) while source volume 315 is concurrently available for production use by application server 1 (310).

The concurrent availability of these volumes allows for time-shifting. Time-shifting is the ability to shift the processing of data to a more optimal time. For example, with reference to FIG. 3, it may be desirable to backup source volume 315 each Monday at 17:00 hours. Point-in-time volume 2 (335) could be created or enabled at 17:00 hours on Monday. Backup server 340 can then perform the backup process on point-in-time volume 2 (335) at some later time, yet the backed up data is as of Monday at 17:00 hours regardless of when the actual backup process is completed. Because the point-in-time process preserves the state of source volume 315 at the particular point in time the relationship was enabled, application server 1 (310) can continue to read and write source volume 315 after Monday at 17:00 hours. That is, source volume 315 is available for production use. Backup server 340 uses a snapshot of source volume 315 to time-shift the backup operation to a more convenient time. For example, it may be desirable for the backup to run only during business hours when an employee can service tape drive 345.

Figure 4:
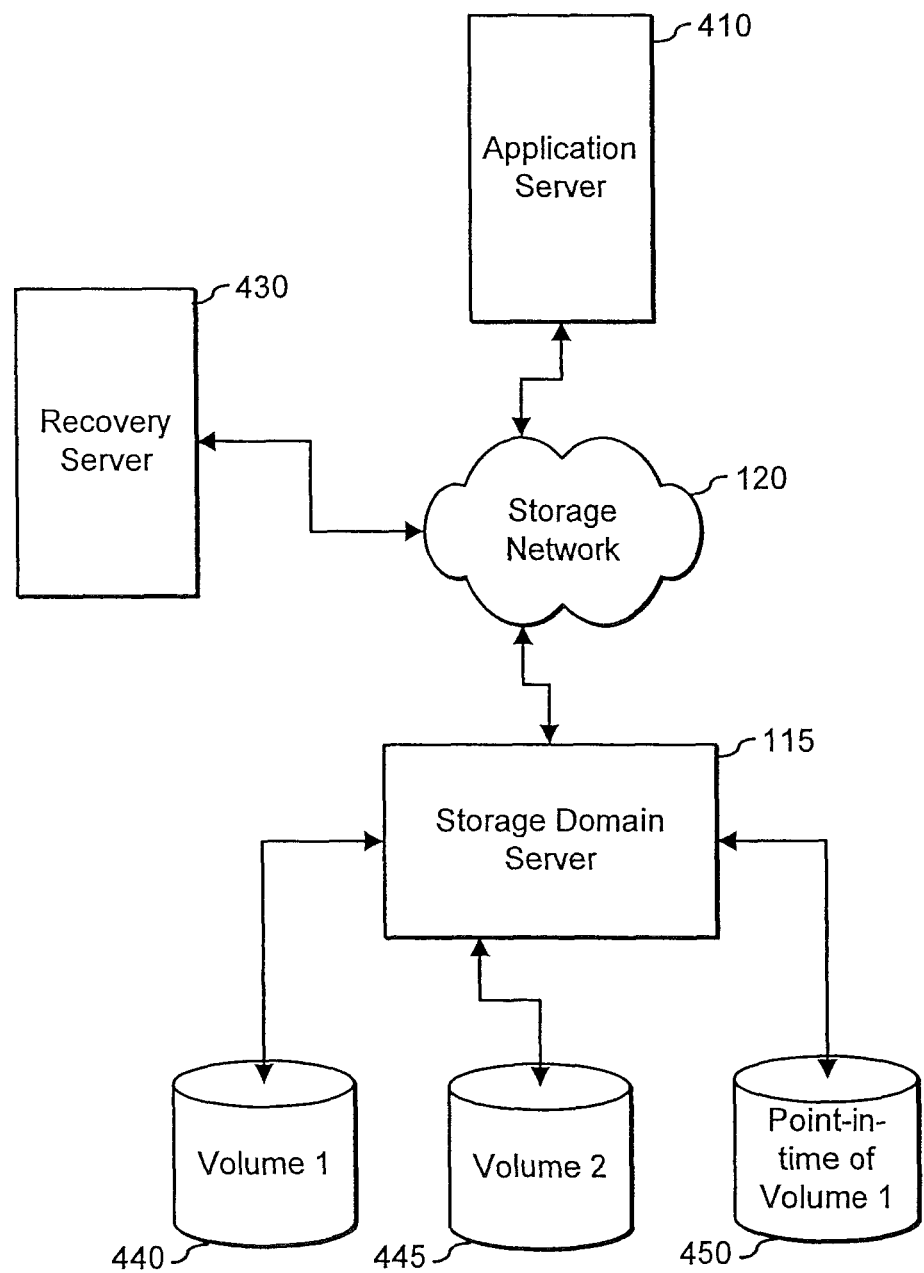
FIG. 4 is a further block diagram illustrating a data storage system including a point-in-time volume according to an embodiment of the present invention.

FIG. 4 is a further block diagram illustrating a data storage system including a point-in-time volume according to an embodiment of the present invention. Application server 410 and recovery server 430 are connected to storage network 120. Storage domain server 115 manages data storage volume 1 (440), volume 2 (445), and point-in-time volume 1 (450). Although storage domain server 115 is depicted as a single server, one skilled in the art will appreciate that additional storage domain servers can be used, e.g., to partition further the storage pool or to provide redundancy in both access to the storage domain servers and data storage devices.

In an embodiment of the present invention, point-in-time volumes are mapped as general-purpose data volumes available for both reading and writing. From a server's perspective, a point-in-time volume appears like a normal data storage volume, such as volume 1 (440, FIG. 4). Multiple machines, processes, or processors, therefore, can perform data sharing on a volume- or file-level.

By way of an example, with further reference to FIG. 4, point-in-time volume 1 (450) is a snapshot of volume 1 (440). Volume 1 (440) is a production database volume used by application server 410. Point-in-time volume 1 (450) is presented to and mapped by recovery server 430. Recovery server 430 performs a database recovery on the table space and transaction logs. The recovery procedure produces a known good image of the database. If a logical error or other failure occurs on volume 1 (440), the recovered database on point-in-time volume 1 (450) can be presented to application server 410. Thus, application server 410 and recovery server 430 were able to share the data on volume 1 (440) to perform their tasks accordingly.

Figure 5:
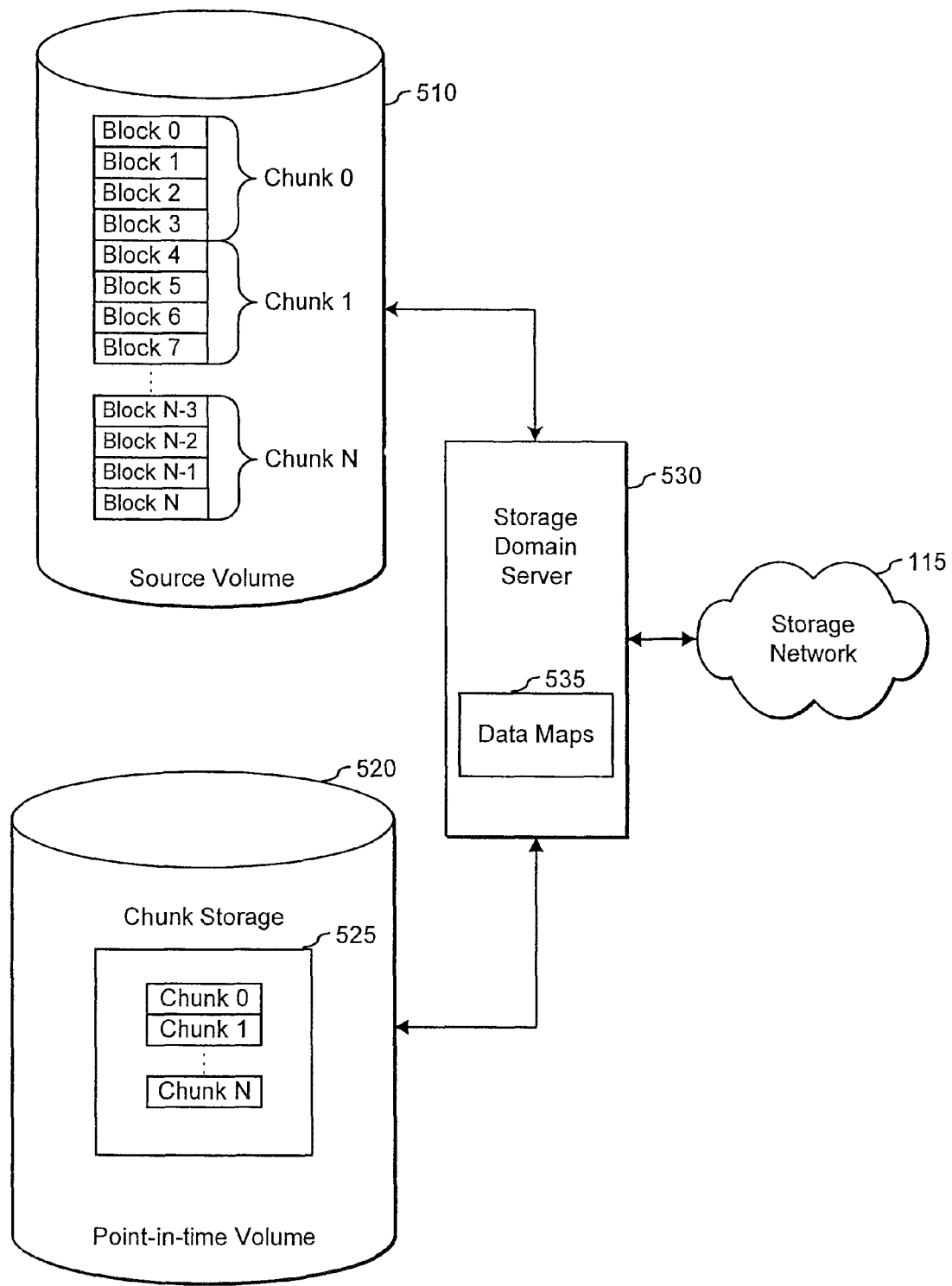
FIG. 5 is a block diagram illustrating details of data chunk allocation and storage.

FIG. 5 is a block diagram illustrating details of data chunk allocation and storage. In an embodiment of the present invention, point-in-time volumes manipulate data blocks in groups called data chunks. One data chunk represents, e.g., a group of 64 data blocks. The number of data blocks per data chunk is configurable, and one skilled in the art will appreciate that, e.g., volume capacity, volume throughput, network capacity, and network latency are among the factors used to configure appropriately data chunk size.

In FIG. 5, source volume 510 and point-in-time volume 520 are attached to storage domain server 530. Storage domain server 530 includes data maps 535. Storage domain server 530 is connected to storage network 115 for interfacing with clients or servers (not shown). In this illustration, source volume 510 is logically segmented into data chunks 0 . . . N, wherein each data chunk contains 4 data blocks. When the point-in-time relationship is enabled, point-in-time volume 520 is dynamically constructed based on the data of source volume 510. In a preferred embodiment of the present invention, data is not copied to point-in-time volume 520 until the data is about to be changed on source volume 510. That is, a data chunk from source volume 510 is copied to data chunk storage 525 before the data is changed on source volume 510, thus preserving the point-in-time relationship. For example, a data write to block 1 of source volume 510 threatens to change corresponding data chunk 0, so data chunk 0 is copied to point-in-time volume 520 before the data write to block 1 occurs on source volume 510. Data chunks that are copied to a point-in-time volume due to data writes on the corresponding source volume are termed point-in-time data chunks.

In an alternative embodiment, data chunks are copied from source volume 510 to point-in-time volume 520 regardless of whether data writes threaten to modify data blocks on source volume 510. Because point-in-time volume 520 is preferably created dynamically without replicating data, point-in-time volume 520 is dependent on source volume 510. In this regard, copying data chunks from source volume 510 to point-in-time volume 520 increases the independence of the point-in-time data set. Data chunks transferred in this manner are termed migration data chunks.

Depending on a user's needs or system configuration, it may be desirable to combine the embodiments of point-in-time data chunks with migration data chunks. This is discussed below with reference, e.g., to FIGS. 7 and 8. Storage domain server 530 handles input/output requests from servers on storage network 115 and manages the relationships among volumes including the copying of data chunks between volumes. Data maps 535 are data structures used to manage the relationship between, e.g., source volume 510 and point-in-time volume 520. Data maps 535 are preferably stored in local data storage on storage domain server 530, however, data maps could be stored elsewhere (e.g., local memory, a remote node on the storage network, source volume, or point-in-time volume).

In an embodiment, each input/output request to source volume 510 or point-in-time volume 520 is treated as an atomic transaction. A transaction is a read request or a write request to either source volume 510 or point-in-time volume 520 in a relationship. A read or write input/output request to source volume 510 or point-in-time volume 520 must wait if the input/output request affects a chunk involved in a currently active input/output request.

In the case of a source volume read or source volume write, the chunk or chunks in all enabled snapshot relationships associated with the source volume that will be referenced by the read or write operation are first locked by the locking algorithm of the driver. The operation on the chunk or chunks is completed. The chunks in all snapshot relationships associated with the volume that will be referenced by the read or write operation are unlocked using the locking algorithm of the driver and the original read or write request is completed. Further, if the read or write operation is to a point-in-time volume, then the lock for the chunk or chunks is taken in only the specific enabled snapshot relationship that is associated with the point-in-time volume. But if the read or write is to the source volume then all enabled relationships that share the same source volume will have their chunk(s) locked for the operation. Although transaction-based locking is described, one skilled in the art will appreciate that other block or chunk locking, consistency, or integrity techniques can be implemented.

FIG. 6 illustrates further details of data maps 535. Data maps 535 preferably includes a migration table 610 and a delta table 620. Migration table 610 is used to determine whether a data chunk has been copied from a source volume to a point-in-time destination volume. As described in greater detail below with reference, e.g., to FIGS. 7 and 8, the migration table indexes both point-in-time data chunk movements and migration data chunk movements. A set bit or "true" indication for a data chunk in migration table 610 indicates that the chunk was copied from a source volume to a point-in-time volume. Delta table 620 tracks which data chunks of a source volume or point-in-time volume have been modified. Thus, a set bit or "true" indication for a data chunk in delta table 620 indicates that a write has occurred on at least one data block with the data chunk.

As an example with reference to FIG. 6, in the chunk 0 entries, migration table 610 indicates "true" and delta table 620 also indicates "true." Chunk 0 likely represents a point-in-time data chunk because the data chunk was copied to the point-in-time volume (as indicated by migration table 610) and a data write occurred on either the source volume or the point-in-time volume (as indicated by delta table 620). In migration table 610, the entries for data chunks 1 and 2 are both "true," yet the corresponding entries in delta table 620 for data chunks 1 and 2 are both "false." Thus, data chunks 1 and 2 are migration data chunks, having been copied from the source volume to the point-in-time volume without the occurrence of a data write. In a preferred embodiment, migration table 610 need not discriminate between migration data chunks and point-in-time data chunks because, as explained further below, migration table 610 is used to determine whether a data chunk has been copied to a point-in-time volume, not the reason the data chunk was copied.

Although migration table 610 and delta table 620 are illustrated as distinct data structures, one skilled in the art will appreciate that the type of state data (e.g., metadata) represented in migration table 610 and delta table 620 can be accessed and stored in numerous configurations of software or hardware.

Figure 7:
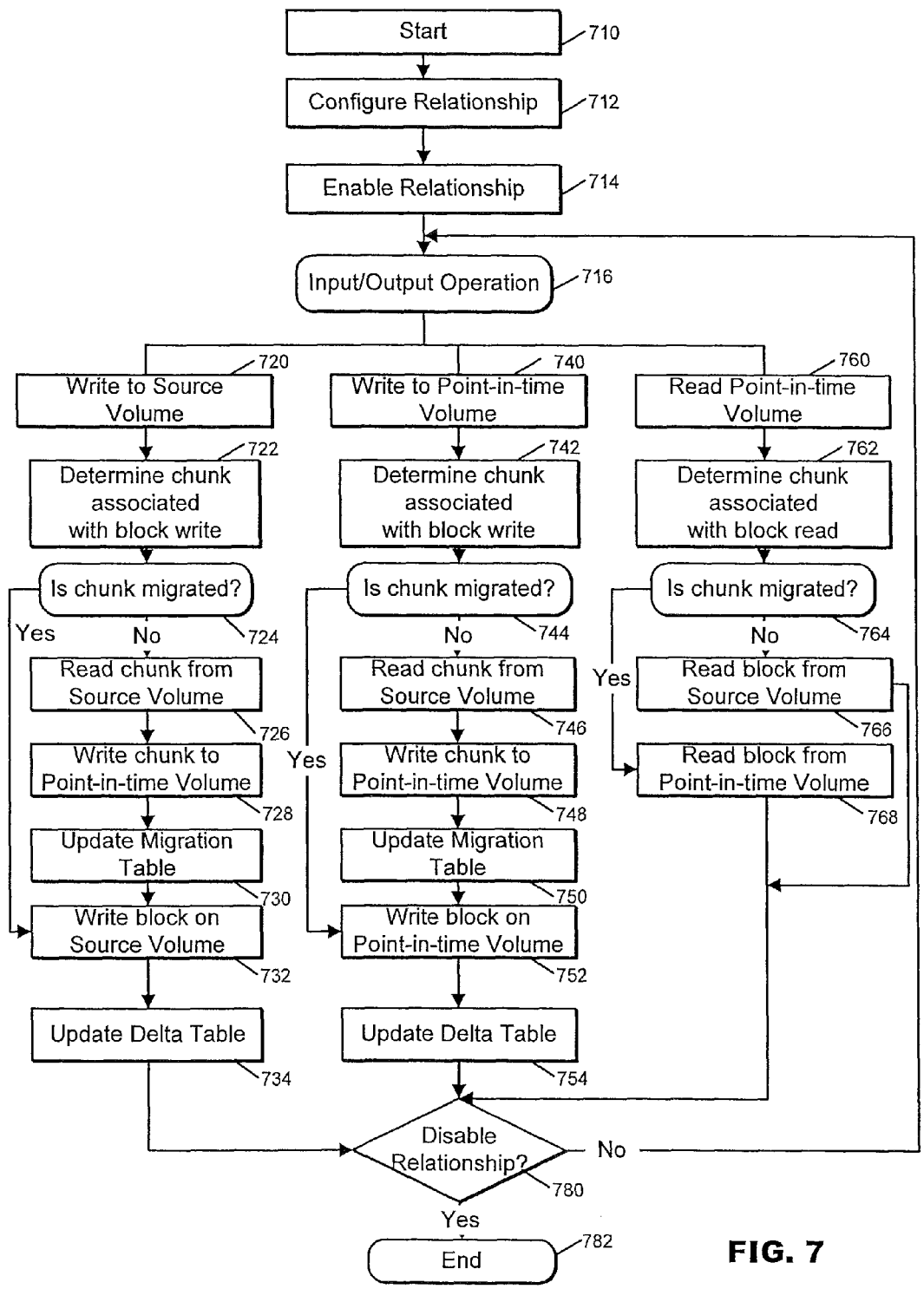
FIG. 7 is a flowchart illustrating methods of creating and using point-in-time volumes in accordance with the present invention.

FIG. 7 is a flowchart illustrating methods of creating and using point-in-time volumes in accordance with the present invention. In a preferred embodiment, a storage domain server (115, FIG. 4) performs the steps illustrated in FIG. 7. The method begins at step 710. Control proceeds to step 712, where a point-in-time relationship is configured. Configuration includes selecting a source volume and a volume to represent the point-in-time snapshot of the source volume. Data chunk size is also selected, determined, or calculated in step 712. Next, in step 714, the relationship between a source volume and point-in-time volume is enabled. Enabling the relationship signals the snapshot layer of the storage domain server to detect data read and write operations to the source volume and point-in-time volume. Further details of the layered architecture of the storage domain server are explained below with reference to FIG. 12. The relationship can be configured and enabled via a graphical user interface on the storage domain server, a command line interface, or an application programming interface.

In step 716, the storage domain server receives an input/output request from, e.g., an application server (410, FIG. 4). Depending on the type of operation involved, control proceeds to step 720, step 740, or step 760. These steps correspond to the following operations: writing to the source volume, writing to the point-in-time volume, and reading from the point-in-time volume. One skilled in the art will appreciate that reading from the source volume is a typical read operation that does not require teaching of a specific implementation.

A method of performing a write to the source volume is now explained. Step 720 begins the process of performing data writes to the source volume. Application servers, e.g., perform writes to data blocks. In step 722, the data chunk associated with the data block to be written is determined. For example, with reference to source volume 510 of FIG. 5, a data write to block 3 corresponds to a write to data chunk 0. This determination is preferably made by mathematical calculation given the number of data blocks on the source volume and the data chunk size configured in step 712 above. One skilled in the art will appreciate, however, that other methods of relating data blocks and data chunks can be implemented (e.g., a database). Next, in step 724, migration table 610 (FIG. 6) is used to determine whether the data chunk to be written has been copied to the related point-in-time volume. As explained above with respect to migration table 610 (FIG. 6), a set bit or "true" status indicates that the data chunk has been copied to the point-in-time volume. If the data chunk has been copied, control jumps to step 732, otherwise control proceeds to step 726.

In step 726, the data chunk determined in step 722 is read from the source volume. This point-in-time data chunk is then written to the point-in-time volume in step 728. Thus, the original contents of the data chunk from the source volume are preserved on the point-in-time volume before new data is written. In step 730, the entry for the data chunk in migration table 610 (FIG. 6) is set to "true" to reflect that the point-in-time data chunk has been copied to the point-in-time volume.

In step 732, the data block is written to the source volume. In step 734, the entry for the data chunk corresponding to the data block in delta table 620 (FIG. 6) is set to "true" to reflect that the data chunk has been modified on the source volume.

That is, the contents of the data chunk on the source volume and point-in-time volume differ. In a preferred embodiment, the state data maintained in delta table 620 (FIG. 6) is used for implementing source update and point-in-time volume update features as explained below (e.g., FIGS. 9 and 10).

Next, in step 780, the storage domain server tests whether the relationship has been disabled. If the relationship is disabled, control proceeds to step 782, where the process ends. Otherwise, control returns to step 716. In a preferred embodiment, data maps 535 (FIG. 5) and chunk storage 525 (FIG. 5) are stored such that the relationship between source volume and point-in-time volume may be re-enabled at the point where operations were suspended.

Returning to step 716, the storage domain server receives a read or write request from, e.g., an application server (410, FIG. 4). Having already discussed a method of performing a write to the source volume, a method of performing a write to the point-in-time volume is now explained beginning with step 740.

Point-in-time volumes are general-purpose volumes to which data can be written. The process of writing data blocks to the point-in-time volume is analogous to the process described above of writing to the source volume. In step 742 (similar to step 722), the data chunk associated with the data block to be written is determined. In step 744 (similar to step 724), migration table 610 (FIG. 6) is used to determine whether the data chunk to be written has been copied to the related point-in-time volume. If the data chunk has been copied, control jumps to step 752, otherwise control proceeds to step 746.

In step 746 (similar to step 726), the data chunk determined in step 742 is read from the source volume. This point-in-time data chunk is then written to the point-in-time volume in step 748. Thus, the data chunk is copied to the point-in-time volume so that new data can be written without affecting the data chunk on the source volume. In step 750, the entry for the data chunk in migration table 610 (FIG. 6) is set to "true" to reflect that the point-in-time data chunk has been copied to the point-in-time volume.

In step 752, the data block is written to the point-in-time volume. In step 754, the entry for the data chunk corresponding to the data block in delta table 620 (FIG. 6) is set to "true" to reflect that the data chunk has been modified on the point-in-time volume. That is, the contents of the data chunk on the source volume and point-in-time volume differ.

Next, in step 780, the storage domain server tests whether the relationship has been disabled. The process of step 780 is described above. Having already discussed a method of performing a write to the source volume and a method of performing a write to the point-in-time volume, reading from the point-in-time volume is now explained beginning with step 760.

Point-in-time volumes are general-purpose volumes from which data can be read. A method of reading from a point-in-time volume begins at step 760. Next, in step 762 (similar to steps 722 and 742), the data chunk associated with the data block to be read is determined. In step 764 (similar to steps 724 and 744), migration table 610 (FIG. 6) is used to determine whether the data chunk to be read has been copied to the related point-in-time volume. If the data chunk has been copied, control jumps to step 768, otherwise control proceeds to step 766.

In step 766, the data block is read from the source volume. Because the associated data chunk has not been copied to the point-in-time volume, the data block is read from the source volume. As described above, data writes to the source volume result in a point-in-time data chunk being transferred to the point-in-time volume to preserve the contents of the data chunk at a particular point in time. If the data chunk, therefore, has not been copied to the point-in-time volume, then that particular data chunk has not been modified on the source volume since the relationship was enabled.

Alternatively, in step 768, the data block is read from the point-in-time volume. The corresponding data chunk is either a point-in-time data chunk or a migration data chunk. In the case of a point-in-time data chunk, the data block must be read from the point-in-time volume to retrieve the data as it existed in a past state (the same data chunk on the source volume has been modified and no longer reflects the particular point in time). In the case of a migration data chunk, the data block could be read from either the source volume or the point-in-time volume because the contents of the data chunks of both volumes are equivalent. In a preferred embodiment, a migration data chunk is read from the point-in-time volume to reduce consumption of bandwidth and storage system resources. Migration data chunks, therefore, increase the independence of the point-in-time volume because data block reads to migration data chunks can be performed on the point-in-time volume rather than exclusively on the source volume. Next, in step 780, the storage domain server tests whether the relationship has been disabled. The operation of step 780 is described above.

Figure 8:
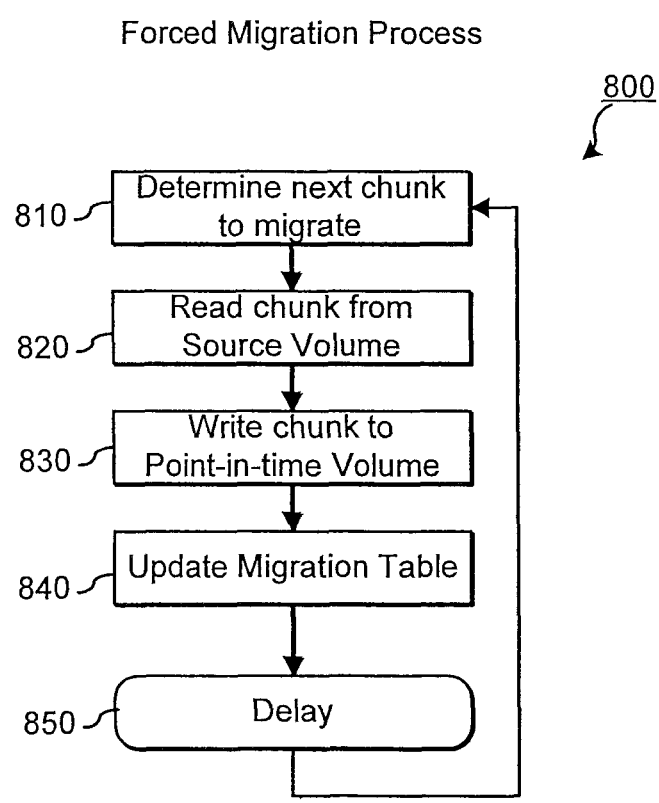
FIG. 8 is a flowchart illustrating a forced migration process.

FIG. 8 is a flowchart illustrating a forced migration process 800. Forced migration refers to copying data chunks from a source volume to a point-in-time volume regardless of whether data writes threaten to modify data blocks on the source volume. Point-in-time volumes are preferably created dynamically without replicating data or making the source volume unavailable. An embodiment of a forced migration process performs data replication without overburdening the source volume. At the completion of a forced migration process, data representing a particular point in time is fully replicated from the source volume. That is, data reads and writes to the point-in-time volume are performed independently from the source volume.

With reference to FIG. 8, a forced migration begins in step 810 by determining the next data chunk to migrate. A storage domain server preferably performs step 810 by sequentially selecting the next chunk marked "false" in migration table 610 (FIG. 6). One skilled in the art, however, will appreciate that other algorithms can be implemented, e.g., selecting the next chunk based on the last volume transaction performed.

In step 820, the selected data chunk is read from the source volume. Next, in step 830, the data chunk is written to the point-in-time volume. In step 840, the migration table is updated to reflect that the selected chunk has been copied to the point-in-time volume.

In the embodiment illustrated in FIG. 8, in step 850, the process delays for a predetermined amount of time, e.g., 20 milliseconds. After delaying, control loops to step 810 where the next data chunk to migrate, if any, is selected. The delay time is selected such that the forced migration process does not overburden the source volume thereby starving or interrupting, e.g., an application server's access to the source volume. One skilled in the art will appreciate that longer or shorter delay times may be appropriate considering data storage system utilization, storage volume throughput, storage network configuration, or other parameters. In another embodiment, an algorithm that evaluates the utilization of the source volume and transfers bursts of data chunks to the point-in-time volume when the source volume is underutilized could replace the delay of step 850.

Figure 9:
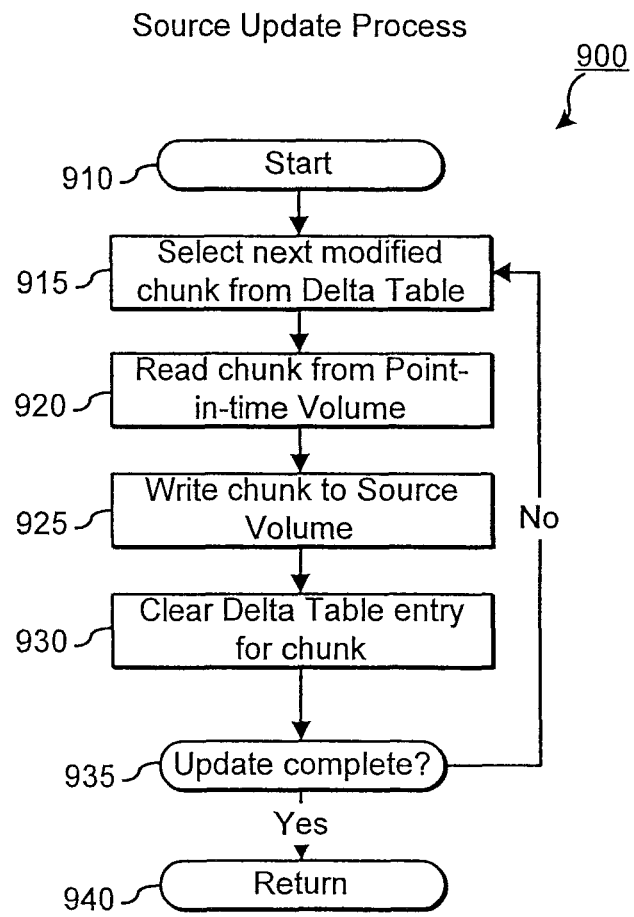
FIG. 9 is a flowchart illustrating a source update process.

FIG. 9 is a flowchart illustrating a source update process 900. Source update refers to copying point-in-time data chunks back to a source volume. In effect, a source update process restores a source volume to a prior state—that of the point-in-time volume. The process begins at step 910. In step 915, a storage domain server preferably sequentially selects the next chunk marked "true" in delta table 620 (FIG. 6). One skilled in the art, however, will appreciate that other selection algorithms can be implemented. In step 920, the selected data chunk is read from the point-in-time volume. Next, in step 925, the selected data chunk is written to the source volume and, in step 930, the delta table entry for the selected data chunk is cleared (marked "false"). In step 935, a storage domain server determines whether the source update process is complete, i.e., whether any entries in the delta table are still marked "true." If modified data chunks remain, control loops to step 915. Otherwise, control returns to the calling process or procedure in step 940.

In another embodiment, source update process 900 includes a delay before step 935 loops to step 915. Similar to step 850 of FIG. 8, the delay time is selected such that the source update process does not overburden system resources. One skilled in the art will appreciate that longer or shorter delay times may be appropriate considering data storage system utilization, storage volume throughput, storage network configuration, or other parameters.

Figure 10:
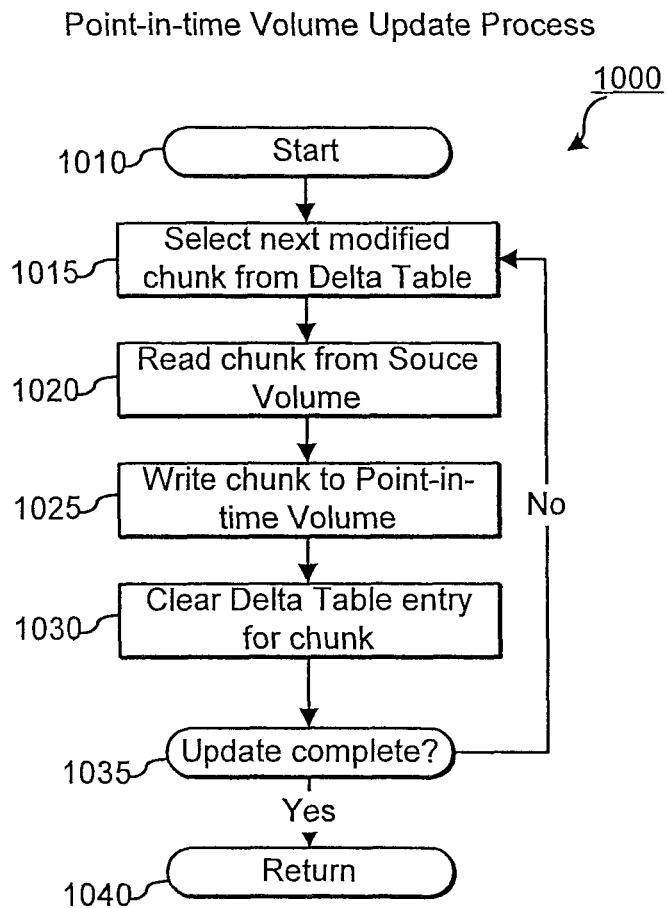
FIG. 10 is a flowchart illustrating a point-in-time volume update process.

FIG. 10 is a flowchart illustrating a point-in-time volume update process 1000. The steps of process 1000 are similar to those of a source update process (900, FIG. 9). Point-in-time volume update refers to copying data chunks modified on a source volume to the point-in-time volume. In effect, a point-in-time volume update process brings the point-in-time volume up-to-date with respect to the source volume. This is analogous to an incremental-type data backup operation. The process begins at step 1010. In step 1015, a storage domain server preferably sequentially selects the next chunk marked "true" in delta table 620 (FIG. 6). One skilled in the art, however, will appreciate that other selection algorithms can be implemented. In step 1020, the selected data chunk is read from the source volume. Next, in step 1025, the selected data chunk is written to the point-in-time volume and, in step 1030, the delta table entry for the selected data chunk is cleared (marked "false"). In step 1035, a storage domain server determines whether the point-in-time update process is complete, i.e., whether any entries in the delta table are still marked "true." If modified data chunks remain, control loops to step 1015. Otherwise, control returns to the calling process or procedure in step 1040.

In another embodiment, point-in-time volume update process 1000 includes a delay before step 1035 loops to step 1015. Similar to step 850 of FIG. 8, the delay time is selected such that the point-in-time volume update process does not overburden system resources. One skilled in the art will appreciate that longer or shorter delay times may be appropriate considering data storage system utilization, storage volume throughput, storage network configuration, or other parameters.

Transaction-based chunk locking is now described with respect to the source update process and point-in-time volume update process. In an embodiment, all chunks are initially locked using the driver locking algorithm discussed above. The driver decides whether to copy the chunk based on whether a write has previously occurred on that chunk. As discussed above, if a write has previously occurred, the chunk is copied. The driver then clears the delta table and removes the lock associated with the copied chunk. Then the driver repeats the process on the next chunk. The locks are removed as the data is processed. This locking strategy is termed a decaying lock. At the end of either update process all locks will have been removed. This locking scheme is used to guarantee that no change to either the source volume or point-in-time volume occurs while the process is determining what needs to be changed based on previously recorded differences.

Further, in the source update case, chunk locks will be taken for all enabled relationships sharing the same source volume configuration. This is because it is the source volume that is being changed by the update process, and as a result of changes to the source volume that may occur, other relationships sharing the same source volume may have their data migrated from the source volume to their respective point-in-time volume before the source volume is changed due to the source update process on a particular snapshot relationship.

With respect to the forced migration process, a chunk is locked while the process determines if the chunk has already been migrated from the source volume to the point-in-time volume. If it has not been migrated, the chunk is migrated and the migration table is updated. Once migrated, the chunk lock is removed, and the driver evaluates the next chunk.

Figure 11:
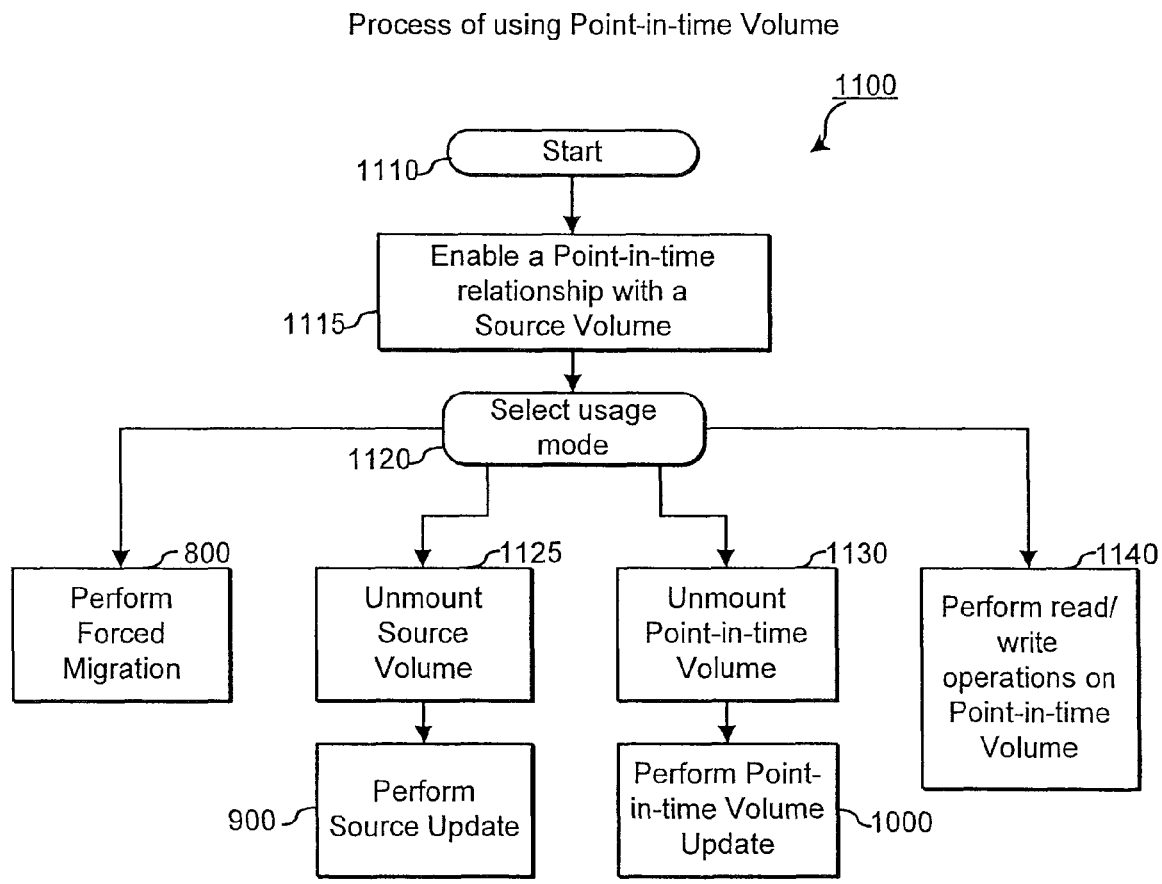
FIG. 11 is a flowchart illustrating an overview of processes of using point-in-time volumes according to embodiments of the present invention.

FIG. 11 is a flowchart illustrating an overview of processes of using point-in-time volumes according to embodiments of the present invention. The process begins with step 1110. Next, a relationship is enabled between a source volume and a point-in-time volume (e.g., step 714, FIG. 7). In step 1120, a usage mode is selected. Usage mode is symbolically used to represent how the storage domain server interacts with the snapshot layer (1240, FIG. 12) and uses a point-in-time volume. Usage modes can be selected via a graphical user interface on the storage domain server, a command line interface, or an application programming interface.

As illustrated in FIG. 11, if forced migration is desired, control proceeds to step 800 (FIG. 8), in which an embodiment of a forced migration process is described above. If a source update is desired, control proceeds to step 1125. Source update generally requires a quiet source volume. In a preferred embodiment, in step 1125, the source volume is unmounted from, e.g., application servers, to quiet the volume. Next, a source update is performed beginning with step 900 on FIG. 9.

Similarly, if a point-in-time volume update is desired, control proceeds to step 1130. Point-in-time volume update also requires a quiet volume. In a preferred embodiment, in step 1130, the point-in-time volume is unmounted from, e.g., application servers, to quiet the volume. Next, a point-in-time volume update is performed beginning with step 1000 on FIG. 10.

Additionally, a point-in-time volume read and write usage mode can be selected. In step 1140, point-in-time volume is used as a general-purpose data storage volume as described above and with reference to FIG. 7. A storage domain server follows the methods disclosed in FIG. 7 to perform read/write operations on the source volume or point-in-time volume. In another embodiment, a storage domain server disables or an application server unmounts a source volume and the data producer or consumer (e.g., application servers or clients) uses the point-in-time volume in accordance with step 1140. It is often desirable to perform, for example, application testing, on the point-in-time volume without altering the source volume. The source volume can be considered a "golden volume" (a known good data set) from which several point-in-time testing volumes can be created and manipulated. In this embodiment, the source volume can be used to return instantly to a prior state by disabling and re-enabling.

One skilled in the art will appreciate that selecting a particular usage mode does not prohibit concurrent operations of other usage modes, i.e., each usage mode does not necessarily operate exclusively on a source volume or point-in-time volume. For example, read and write operations can occur on a source or point-in-time volume during a forced migration process.

Figure 12:
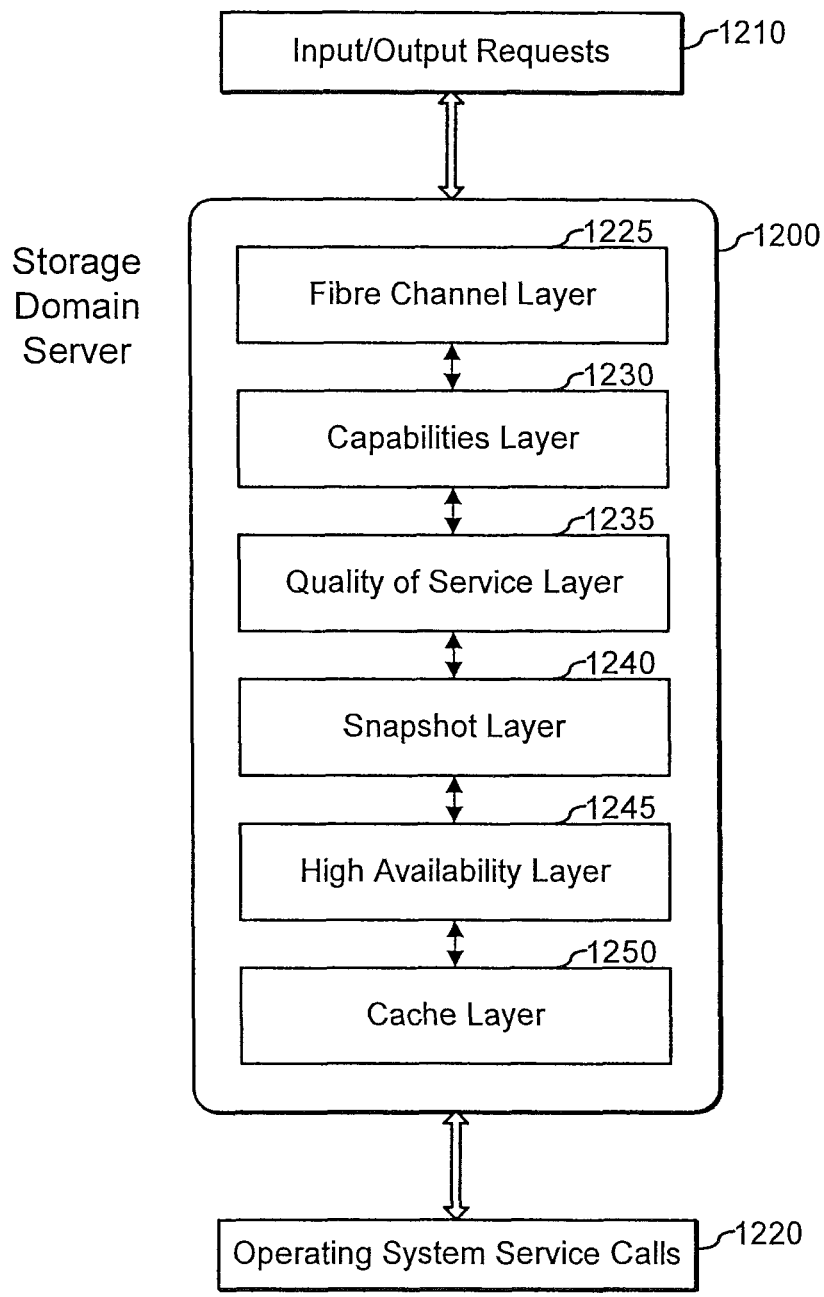
FIG. 12 is a functional block diagram of a storage domain server illustrating data processing layers.

FIG. 12 is a functional block diagram of a storage domain server 1200 illustrating data processing layers. Storage domain server 1200 interfaces with input/output requests 1210 generated by, e.g., application servers. Storage domain server 1200 processes input/output requests 1210 to form operating system service calls 1220. Operating system service calls 1220 represent commands that are issued to backend data storage devices. Storage domain server 1200 includes the following processing layers: fibre channel layer 1225, capabilities layer 1230, quality of service layer 1235, snapshot layer 1240, high availability layer 1245, and cache layer 1250. Fibre channel layer 1225 receives fibre channel commands from the protocol interface and translates those commands into internal input/output API requests. Capabilities layer 1230 receives requests from the internal input/output API and performs authentication and initial routing to the appropriate backend storage handle. Capabilities layer 1230 also performs configuration operations where storage handles are associated with backend disk volumes. Quality of service layer 1235 monitors traffic flow and uses flow control to establish and to ensure the priority of requests to particular volumes or to guarantee the deterministic performance of particular volumes. Snapshot layer 1240 detects or monitors read and write operations to a source volume and/or a point-in-time volume. Snapshot layer 1240 performs other point-in-time related functions, e.g., chunk locking, forced migration, source update, and point-in-time volume update. High availability layer 1245 ensures that an input/output request can be satisfied even though a path to data may fail. In an example configuration, two copies of the data are on two different storage domain servers. If the primary storage domain server fails, e.g., to read from its disk volume, the request is reissued to the secondary storage domain server, which completes the original request. High availability layer 1245 further provides a maintenance facility to allow one to replace a disk and resynchronize it from the currently good active copy of the data. Cache layer 1250 manages a data cache for improving the time it takes to read from or write to data storage volumes. As illustrated in FIG. 12, snapshot layer 1240 receives data from input/output requests 1210 before cache layer 1250 processes the request: In another embodiment of the present invention, the relative positions of snapshot layer 1240 and cache layer 1250 can be swapped, i.e., snapshot layer 1240 would be below the cache. In this embodiment, the data cache would need to be invalidated and flushed when enabling a snapshot relationship between a source volume and a point-in-time volume.

As discussed above, the relationship between a source volume and point-in-time volume (snapshot relationship) can be configured and managed via a graphical user interface, a command line interface, or an application programming interface. Table 1 is an example of a list of interface commands, where DcsSnap# is a parameter that identifies the relationship. One skilled in the art will appreciate how to implement and to use these commands in view of the above detailed description.

TABLE 1

Command line interface.

| CLI Command | Description |
| --- | --- |
| DisableSnap DcsSnap# | Disables a particular snapshot relationship |
| EnableNewSnap DcsSnap# | Enables an existing snapshot relationship. Use this CLI command if there are data maps configured with that relationship, but you would like to ignore the data map's capabilities. Otherwise, use EnableSnap DcsSnap#. |
| EnableSnap DcsSnap# | Enables an existing snapshot relationship. If there is a data map configured with the relationship, but you would like to ignore the data map's capabilities, use EnableNewSnap DcsSnap#. |
| GetSnapActiveConfig DcsSnap# | Retrieves the currently active settings for a particular enabled snapshot relationship |
| GetSnapConfig DcsSnap# | Retrieves the settings for a particular snapshot relationship |
| GetSnapStatus DcsSnap# | Retrieves the status of a particular snapshot relationship |
| StartCompleteImage DcsSnap# | Starts the Forced Migration Process on a snapshot relationship |
| StartImageUpdate DcsSnap# | Starts the Point-in-time Volume Update Process on a snapshot relationship |
| StartSourceUpdate DcsSnap# | Starts the Source Update Process on a particular snapshot relationship |
| SetCompleteImageDelay [#ms] DcsSnap# | Sets the Forced Migration Delay on a particular snapshot relationship |
| SetImageUpdateDelay [#ms] DcsSnap# | Sets the Point-in-time Volume Update Delay on a particular snapshot relationship |
| SetSourceUpdateDelay [#ms] DcsSnap# | Sets the Source Update Delay on a particular snapshot relationship |
| StopCompleteImage DcsSnap# | Stops the Forced Migration Process on a particular snapshot relationship |
| StopImageUpdate DcsSnap# | Stops the Point-in-time Volume Update Process on a particular snapshot relationship |
| StopSourceUpdate DcsSnap# | Stops the Source Update Process on a particular snapshot relationship |

Additionally, the relationship between a source volume and point-in-time volume (snapshot relationship) can be configured and managed via an application programming interface (API). Table 2 is an example of an API. One skilled in the art will appreciate how to implement and to use an API in view of the above detailed description.

TABLE 2

Application programming interface

| API | Description |
| --- | --- |
| DcsPITDeviceAbortImageCompletion | Stops the data replication process on a specific snapshot relationship |
| DcsPITDeviceAbortImageUpdate | Stops the Point-in-time Volume Update process on a specific snapshot relationship |
| DcsPITDeviceAbortSourceUpdate | Stops the Source Update process on a specific snapshot relationship |
| DcsPITDeviceCloseHandle | Disassociates a handle from the corresponding snapshot relationship |
| DcsPITDeviceCreateHandle | Creates a handle for an existing snapshot relationship |
| DcsPITDeviceDelayImageCompletion | Sets a millisecond delay between data replication transfers associated with the Forced Migration Process. This ability to slow down or speed up the data replication process associated with the |

TABLE 2-continued

Application programming interface

| API | Description |
|---|---|
| | creation of a BCV can lower the overall system load during periods of peak system usage. |
| DcsPITDeviceDelayImageUpdate | Sets a millisecond delay between data replication transfers associated with the Point-in-time Volume Update process. This ability to slow down or speed up the data replication process associated with the creation of a BCV can lower the overall system load during periods of peak system usage. |
| DcsPITDeviceDelaySourceUpdate | Sets a millisecond delay between data replication transfer associated with the Source Update process |
| DcsPITDeviceDisable | Disables a specific snapshot relationship in order to disassociate that relationship from further interaction with any applications |
| DcsPITDeviceEnable | Initializes a specific snapshot relationship |
| DcsPITDeviceGetActiveConfigure | Retrieves the currently active settings for a specific enabled snapshot relationship |
| DcsPITDeviceGetActiveMaps | Retrieves the currently active mapsize, chunksize, well as the two bitmaps associated with the snapshot relationship |
| DcsPITDeviceGetConfigure | Retrieves the settings for a specific snapshot relationship |
| DcsPITDeviceGetStatus | Retrieves the status of a particular snapshot relationship pertaining to the percent difference between the source and the point-in-time destination volumes, as well as the percent completion of the point-in-time destination volume |
| DcsPITDeviceStartImageCompletion | Starts the data replication process on a specific snapshot relationship in order to create a full copy (point-in-time destination volume) that can be used independent of the volume from which it was created (source volume) |
| DcsPITDeviceStartImageUpdate | Starts the data replication process on a specific snapshot relationship in order to update the point-in-time destination volume from the source volume since a forced migration had been performed. |
| DcsPITDeviceStartSourceUpdate | Starts the Source Update process on a specific snapshot relationship. In some scenarios, updating the source volume from which the destination volume was derived, and using an established destination volume can give you the ability to update the source volume from a previous point-in-time. |
| DcsPMGenerateVolumeID | Creates a Volume ID for a specific partition in order to translate a hard disk number and partition number into its corresponding Volume ID |
| DcsPMGetSDSVolumeID | Retrieves the SDS Volume ID for a specific disk in order to translate a hard disk number and partition number into their corresponding SDS-presented Volume ID |
| DcsPMListVolumes | Retrieves all of the Volume IDs in the system in order to retrieve a list of all of the volumes local to the machine |
| DcsPMTranslateVolumeID | Translates a Volume ID into a corresponding disk number and partition number |

Having described preferred embodiments of methods and apparatus for point-in-time volumes (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for changing a time reference for a point-in-time volume that has previously been established to a current time reference of a source volume, the method comprising:
   maintaining mapping data comprising delta information, the delta information identifying data that has been modified on the source volume, said modification being determined by detecting write operations directed to the source volume; and
   changing the time reference for the point-in-time volume to the current time reference of the source volume, following the previous establishment of the point-in-time volume and intervening writes to the source volume, by transferring modified data identified by the delta information, with at least one read operation directed to the source volume and at least one write operation directed to the point-in-time volume.

2. The method of claim 1, further comprising:
   clearing the delta information corresponding to the transferred modified data.

3. The method of claim 1, further comprising:
   delaying transferring the modified data responsive to a factor selected from the group consisting of: system utilization, system throughput, and system configuration.

4. The method of claim 1, wherein the modified data comprises one or more data blocks.

5. The method of claim 1, wherein a second point-in-time volume is established for a second time after the current time reference of the previously established point-in-time volume, and wherein the previously established point-in-time volume is configured to support a restoration of the source volume to the state of the previously established point-in-time volume at a time occurring after the second time, the restoration of the source volume occurring without invoking the second point-in-time volume.

6. The method of claim 1, wherein changing the time reference for the point-in-time volume to the current time reference of the source volume is performed without requiring reference to migration information.

7. A non-transitory computer readable medium storing program code for changing a time reference for a point-in-time volume that has previously been established to a current time reference of a source volume, the program code being executable to perform operations comprising:
- maintaining mapping data comprising delta information, the delta information identifying data that has been modified on the source volume, said modification being determined by detecting write operations directed to the source volume; and
- changing the time reference for the point-in-time volume to the current time reference of the source volume, following the previous establishment of the point-in-time volume and intervening writes to the source volume, by transferring modified data identified by the delta information, with at least one read operation directed to the source volume and at least one write operation directed to the point-in-time volume.

8. The computer readable medium of claim 7, wherein the operations further comprise:
- clearing the delta information corresponding to the transferred modified data.

9. The computer readable medium of claim 7, wherein the operations further comprise:
- delaying transferring the modified data responsive to a factor selected from the group consisting of: system utilization, system throughput, and system configuration.

10. The computer readable medium of claim 7, wherein the modified data comprises one or more data blocks.

11. The computer readable medium of claim 7, wherein a second point-in-time volume is established for a second time after the current time reference of the previously established point-in-time volume, and wherein the previously established point-in-time volume is configured to support a restoration of the source volume to the state of the previously established point-in-time volume at a time occurring after the second time, the restoration of the source volume occurring without invoking the second point-in-time volume.

12. The computer readable medium of claim 7, wherein changing the time reference for the point-in-time volume to the current time reference of the source volume is performed without requiring reference to migration information.

13. A method for creating a point-in-time volume of a source volume, the method comprising:
- enabling a relationship between the source volume and the point-in-time volume;
- receiving a data write operation;
- determining whether a data write operation directed to the source volume is directed to an original data block in the source volume, an original data block being a data block existing in the source volume at the time the relationship is enabled;
- reading the original data block from the source volume prior to completing the data write operation where it is determined that the data write operation is directed to the original data block; and
- storing the original data block in association with the point-in-time volume.

14. A non-transitory computer readable medium storing program code for creating a point-in-time volume of a source volume, the program code being executable to perform operations comprising:
- enabling a relationship between the source volume and the point-in-time volume;
- receiving a data write operation;
- determining whether a data write operation directed to the source volume is directed to an original data block in the source volume, an original data block being a data block existing in the source volume at the time the relationship is enabled;
- reading the original data block from the source volume prior to completing the data write operation where it is determined that the data write operation is directed to the original data block; and
- storing the original data block in association with the point-in-time volume.

* * * * *